United States Patent [19]

Wasserman

[11] 4,414,960
[45] Nov. 15, 1983

[54] SOLAR COLLECTION MAT ELEMENT
[75] Inventor: Kurt J. Wasserman, Westtown, N.Y.
[73] Assignee: Insolar, Inc., Port Jervis, N.Y.
[21] Appl. No.: 376,419
[22] Filed: May 10, 1982
[51] Int. Cl.³ ............................. F24J 3/02; F28F 1/00
[52] U.S. Cl. .................................... 126/426; 126/448; 165/46; 165/76
[58] Field of Search ............... 126/426, 446, 448, 442; 165/46, 168, 171, 173, 76

[56] References Cited

U.S. PATENT DOCUMENTS

| | | | |
|---|---|---|---|
| 3,648,768 | 3/1972 | Scholl | 165/171 |
| 4,112,921 | 9/1978 | MacCracken | 126/448 |
| 4,114,598 | 9/1978 | Van Leeuwen | 126/446 |
| 4,131,110 | 12/1978 | Jones, Jr. | 126/426 |
| 4,176,654 | 12/1979 | Zinn et al. | 126/448 |
| 4,258,703 | 3/1981 | Reitmaier | 126/445 |
| 4,270,596 | 6/1981 | Zinn et al. | 165/171 |

OTHER PUBLICATIONS

Brochure of Insolar, Inc. for H₂Otrak, Nov. 1981.

Primary Examiner—Lee E. Barrett
Attorney, Agent, or Firm—Jack D. Slobod

[57] ABSTRACT

A solar energy collection mat element of unitary black elastomeric or flexible plastic consists of a side-by-side series of parallel pipes with integral connecting material between the pipes defining tear lines. The last pipe of the series has a longitudinally directed slit, allowing the last pipe to be opened transversely and placed in gripping relationship about the first pipe of another similar mat element.

2 Claims, 1 Drawing Figure

SOLAR COLLECTION MAT ELEMENT

FIELD OF THE INVENTION

The present invention relates generally to heat exchange apparatus and more particularly to solar energy collection mats composed of a series of parallel pipes through which a heat transfer fluid is circulated to carry collected solar thermal energy to a location remote from the mat. In its more specific aspects, the present invention relates to solar energy collection mat elements which are combined to be coupled together transversely to form a larger mat.

BACKGROUND OF THE INVENTION

The usual solar collector includes a generally black mat structure for absorbing radiant solar energy. This structure generally includes a matrix or series of tubes or pipes in heat transfer relationship with the mat through which a heat transfer fluid such as water is circulated by means of a pump to convey the absorbed thermal energy to a location remote from the solar collector for storage or for immediate use. The various tubes or pipes may be interconnected in series or in parallel or in combination thereof in any manner necessary to optimally match the mat with the characteristics of the pump. In the case of parallel tubes, u-shaped connectors are used for series connections and headers for parallel connections.

Flexible mat structures of generally parallel elastomeric tubes are well known. They provide low cost designs which are relatively immune to breakage. Also the use of flexible material permits the incorporation of webs and tear lines between adjacent tubes to allow the mat to be trimmed to a desired width.

However, the elastomeric mat structures are not as thermally conductive as their metal counterparts, and therefore, thermal energy absorbed by substantially large webs between adjacent tubes is not efficiently transferred to the fluid circulating in the pipes.

OBJECTS OF THE INVENTION

It is an object of the present invention to provide an elastomeric or flexible plastic solar energy collection mat element which consists of nearly tangent tubes without collection area wasted for webs or spaces between the tubes.

It is a further object of the present invention to provide transversely interconnectible elongated solar energy collection mat elements wherein is a minimum of wasted collection area at the point where the elements are interconnected.

SUMMARY OF THE INVENTION

Briefly, the aforementioned and other objects of the present invention are satisfied by providing a solar energy collection mat element of unitary, substantially black elastomeric or flexible plastic construction which is composed of a series of side-by-side, nearly tangent, parallel pipes. The integral portions at the points of near-tangency define tear lines for easily separating the tubes when desired as for connection to interconnecting pipes or for trimming the mat element to a desired width. The pipes at one end of the series is slitted throughout its length to define a pair of opposed wings of semi-circular cross section. These wings may be snapped around the end pipe of another similar mat element to maintain the mat elements in closely-spaced relationship with a minimum of wasted area.

Other objects, features and advantages of the present invention will become apparent upon perusal of the following detailed description of the invention when taken in conjunction with the appended drawing.

DETAILED DESCRIPTION OF THE INVENTION

Figure 1:
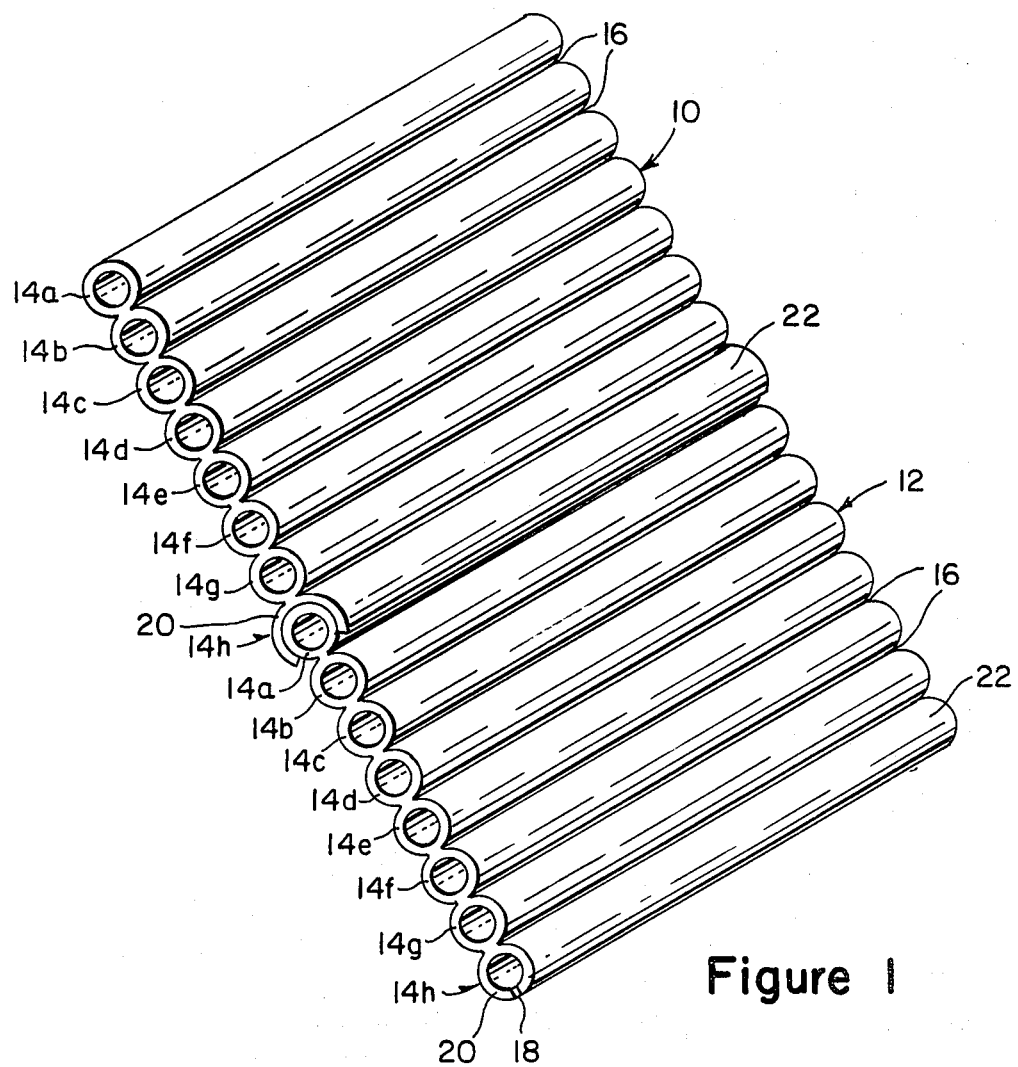
FIG. 1 is a three (3) dimensional presentation of a pair of mat elements of the present invention transversely coupled together.

In the drawing, there is illustrated a pair of coupled together identical mat elements 10 and 12, of the present invention. Each of the mat elements 10 and 12 is a unitary structure, as produced by extrusion or molding, and is composed of an elastomeric or flexible plastic material, preferably polyolefin plastic or cross-linked polyofefin or EPDM or EPT (ethylene-propylene-terpolymer) synthetic rubber. These materials have the combination of suitable temperature characteristics and of suitable flexibility. For solar energy absorption and good thermal conductivity the plastic or elastomer should contain approximately 35% by weight of carbon black or other compatible dark thermally conductive filler.

In view of the constant cross-sections of the mat elements, extrusion is the most preferable method of manufacture. The mat elements may either be provided in fixed usable lengths such as 12 to 25 feet or may be provided in rolls of in the order of 100 to 400 foot lengths to be cut to usable lengths by the installer.

The mat elements 10 and 12, each comprise a series of side-by-side parallel relatively thin walled pipes or tubes 14a–14h preferably have an inside diameter ranging between ¼ inch and ¾ inch and a wall thickness of about 1/16 or 3/32 inch. In order to minimize any wasted area between the tubes, they are in near-tangency, their outside diameter being spaced apart only about 1/32 inch. Integral connecting material filling this distance between adjoining tubes is about 1/32 inch in both thickness and width so as to define a tear line 16 between each adjacent pair of pipes at which the pipes 14a–14h may be easily separated along their entire lengths or any portion thereof.

The pipes 14a–14g are provided as conduits for heat transfer fluid such as water. However, the last pipe 14h in each mat element 10 and 12, has a radially and longitudinally directed slit 18 at the side of the mat. Slit 18 runs through the wall of pipe 14h and along its entire length. Thus, pipe 14h may be transversely spread apart into two (2) wings, 20 and 22, of opposed accurate cross-section.

As shown in the drawing, the first tube 14a of the mat element 12 may be snapped between wings 20 and 22, so that the wings overlap the first tube. In this position, the exterior of the first tube 14a of the mat element 12 is engaged and gripped by the flexible wings 20 and 22 to hold the elements 10 and 12 in side-by-side relationship. This overlapping process may be continued with additional mat elements to create a solar energy collection mat of any desired size. This means of transversely coupling elements is not only easily used, but also involves the loss of only minimal collection area, since the tube 14a when overlapped with wings 20 and 22 remains effective in absorbing radiant solar thermal energy.

The general methods for use of flexible solar energy collection mats are detailed in the following patents: U.S. Pat. No. 4,112,921 to Mac Cracken, issued Sep. 12, 1978; U.S. Pat. No. 4,176,654 and No. 4,270,596 to Zinn et al issued respectively Dec. 4, 1979 and June 2, 1981; and U.S. Pat. No. 4,292,957 to Wasserman issued Oct. 6, 1981, which are herein incorporated by reference.

As now should be apparent, the objects of this invention have been fulfilled. While the invention has been described in specific detail, numerous modifications, additions and ommissions are possible in these details within the intended spirit and scope of the invention.

What is claimed is:

1. A pair of substantially identical solar energy collection mat elements each said element comprising an elongated unitary structure of substantially black material selected from elastomerics and flexible plastics and of substantially constant cross-section, configured as a series of side-by-side relatively thin-walled parallel pipes of substantially the same cross sectional dimensions, each pair of adjacent pipes of each mat element being substantially tangent to each other, integral connecting material between each said pair of adjacent pipes defining a longitudinally directed tear line, said series of pipes of each mat element including a first pipe at one extreme side of said series and a last pipe at the opposite extreme side of said series, said last pipe having a longitudinally directed slit in its wall along a line generally most remote from the other of said pipes of said mat element and running the entire length of said last pipe, so as to divide said last pipe into opposed flexible wings of arcuate cross-section, said wings of one of said mat elements grippingly overlapping substantially the entire exterior of the first pipe of the other solar collection mat element, each pipe (of said series) heretofore mentioned with the exception of the last pipe of each mat element being configured for conveying fluid.

2. The element in claim 1, wherein said pipes are of circular cross-section and said opposed wings are generally of semi-circular cross-section.

* * * * *